United States Patent
Graf Fernandes et al.

(10) Patent No.: US 11,823,449 B2
(45) Date of Patent: Nov. 21, 2023

(54) IDENTIFYING CHANGES IN FIREBREAK LINES

(71) Applicant: International Business Machines Corporation, Armonk, NY (US)

(72) Inventors: Paulo Henrique Graf Fernandes, Campinas (BR); Juscelino Candido De Lima Junior, Campinas (BR); Deborah Bruna Berto, Monte Mor (BR); Erich Casagrande Perusso, Campinas (BR); Paulo Henrique Almeida Cavoto, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/493,908

(22) Filed: Oct. 5, 2021

(65) Prior Publication Data
US 2023/0108318 A1  Apr. 6, 2023

(51) Int. Cl.
*G06V 20/10* (2022.01)
*G06V 10/25* (2022.01)
*G06V 10/75* (2022.01)

(52) U.S. Cl.
CPC ............ *G06V 20/188* (2022.01); *G06V 10/25* (2022.01); *G06V 10/751* (2022.01)

(58) Field of Classification Search
CPC ..... G06V 20/188; G06V 10/25; G06V 10/751
See application file for complete search history.

(56) References Cited

U.S. PATENT DOCUMENTS

| | | | |
|---|---|---|---|
| 2007/0097143 A1* | 5/2007 | Ii | G06T 11/60 |
| | | | 345/592 |
| 2012/0101784 A1 | 4/2012 | Lindores et al. | |
| 2016/0223506 A1 | 8/2016 | Shriver et al. | |
| 2018/0292661 A1* | 10/2018 | Songa | G01C 23/005 |
| 2020/0097720 A1* | 3/2020 | Yang | G06N 3/045 |
| 2022/0135324 A1* | 5/2022 | Whelan | B65G 57/005 |
| | | | 414/266 |

FOREIGN PATENT DOCUMENTS

| | | | | |
|---|---|---|---|---|
| EP | 939338 | * | 2/1999 | G03D 15/00 |
| WO | WO97/35433 | * | 9/1997 | H04N 7/18 |

OTHER PUBLICATIONS

Anonymous, "Extract Differences by Synthesizing Two Satellite Images Taken at Different Times." Dec. 28, 2019. 26 Pages.
(Continued)

*Primary Examiner* — Myron Wyche
(74) *Attorney, Agent, or Firm* — CANTOR COLBURN LLP; Erik Johnson

(57) ABSTRACT

Embodiments of the invention are directed to detecting changes to a firebreak line in an environment. Aspects include obtaining a reference aerial image of an area of interest and a current aerial image of the area of interest and identifying, based on the reference aerial image, one or more firebreak lines in the area of interest. Aspects also include identifying, based on a comparison of the reference aerial image and the current aerial image, an anomaly in at least one of the one or more firebreak lines. Aspects further include transmitting an alert, based on detecting the anomaly, the alert including an indication of the detected anomaly.

18 Claims, 7 Drawing Sheets

(56) References Cited

OTHER PUBLICATIONS

Anonymous. "Negative transformation of an image using Python and OpenCV." geeksforgeeks.org. Mar. 11, 2020. 11 Pages.
E. Erten et al., "Forest Fire Risk Zone Mapping from Satellite Imagery And Gis: A Case Study." https://www.researchgate.net/publication/228608573. Jan. 2002. 8 Pages.
E. Maltsev et al., "The Technology to Identify Firebreak Plowing Objects Based on the Satellite Data of the Earth Remote Sensing." E3S Web of Conferences. 6 Pages. 2018.
J. Pereira-Pires et al., "Semi-Automatic Methodology for Fire Break Maintenance Operations Detection with Sentinel-2 Imagery and Artificial Neural Network." MDPI journals. Mar. 12, 2020. 23 Pages.
W.Vorster, "Assessment and analysis of wildfires with the aid of Remote Sensing and GIS." 2013. 101 Pages.

\* cited by examiner

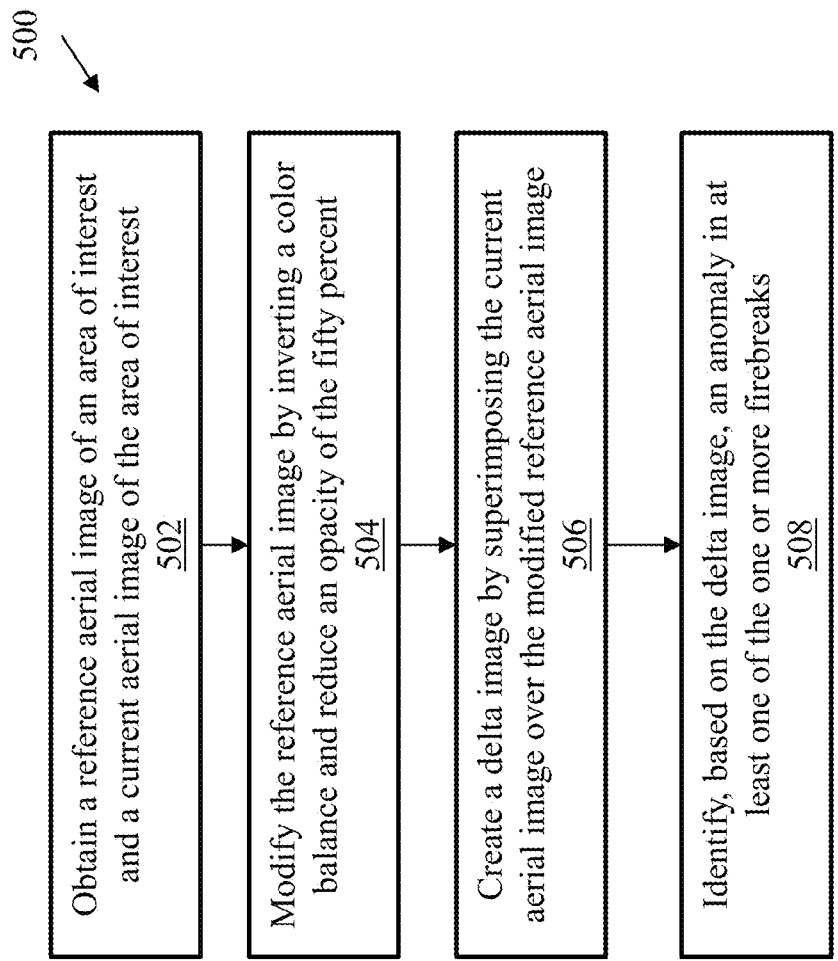

IDENTIFYING CHANGES IN FIREBREAK LINES

BACKGROUND

The present invention generally relates to monitoring firebreak lines, and more specifically, to monitoring firebreak lines in an environment to detect changes to the firebreak lines.

A firebreak line is an area of land between planting areas and forests that has been thinned, i.e., has had the vegetation removed in the area. Firebreak lines are configured to prevent the spread of a fire by removing the fuel for a fire in the area. Once a firebreak line has been created, the firebreak line needs to keep clean, i.e., free of fuel for a potential fire. Monitoring firebreak lines are traditionally performed by people manually inspecting the firebreak lines on a periodic basis. Currently, either at a local or national level, there is a lack of human resources to manually monitor and patrol thousands of kilometers in fire break lines.

SUMMARY

Embodiments of the present invention are directed to a computer-implemented method for detecting changes to a firebreak line. A non-limiting example of the computer-implemented method includes obtaining a reference aerial image of an area of interest and a current aerial image of the area of interest and identifying, based on the reference aerial image, one or more firebreak lines in the area of interest. The method also includes identifying, based on a comparison of the reference aerial image and the current aerial image, an anomaly in at least one of the one or more firebreak lines. The method further includes transmitting an alert, based on detecting the anomaly, the alert including an indication of the detected anomaly.

Embodiments of the present invention are directed to a system for detecting changes to a firebreak line. A non-limiting example of the system includes a processor communicative coupled to a memory, the processor configured to obtain a reference aerial image of an area of interest and a current aerial image of the area of interest and identify, based on the reference aerial image, one or more firebreak lines in the area of interest. The processor is also configured to identify, based on a comparison of the reference aerial image and the current aerial image, an anomaly in at least one of the one or more firebreak lines. The processor is further configured to transmit an alert, based on detecting the anomaly, the alert including an indication of the detected anomaly.

Embodiments of the invention are directed to a computer program product for detecting changes to a firebreak line, the computer program product comprising a computer readable storage medium having program instructions embodied therewith. The program instructions are executable by a processor to cause the processor to perform a method. A non-limiting example of the method includes obtaining a reference aerial image of an area of interest and a current aerial image of the area of interest and identifying, based on the reference aerial image, one or more firebreak lines in the area of interest. The method also includes identifying, based on a comparison of the reference aerial image and the current aerial image, an anomaly in at least one of the one or more firebreak lines. The method further includes transmitting an alert, based on detecting the anomaly, the alert including an indication of the detected anomaly.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow diagram of a method for comparing aerial images of an area identify an anomaly in a firebreak according to one or more embodiments of the invention;

Figure 1:
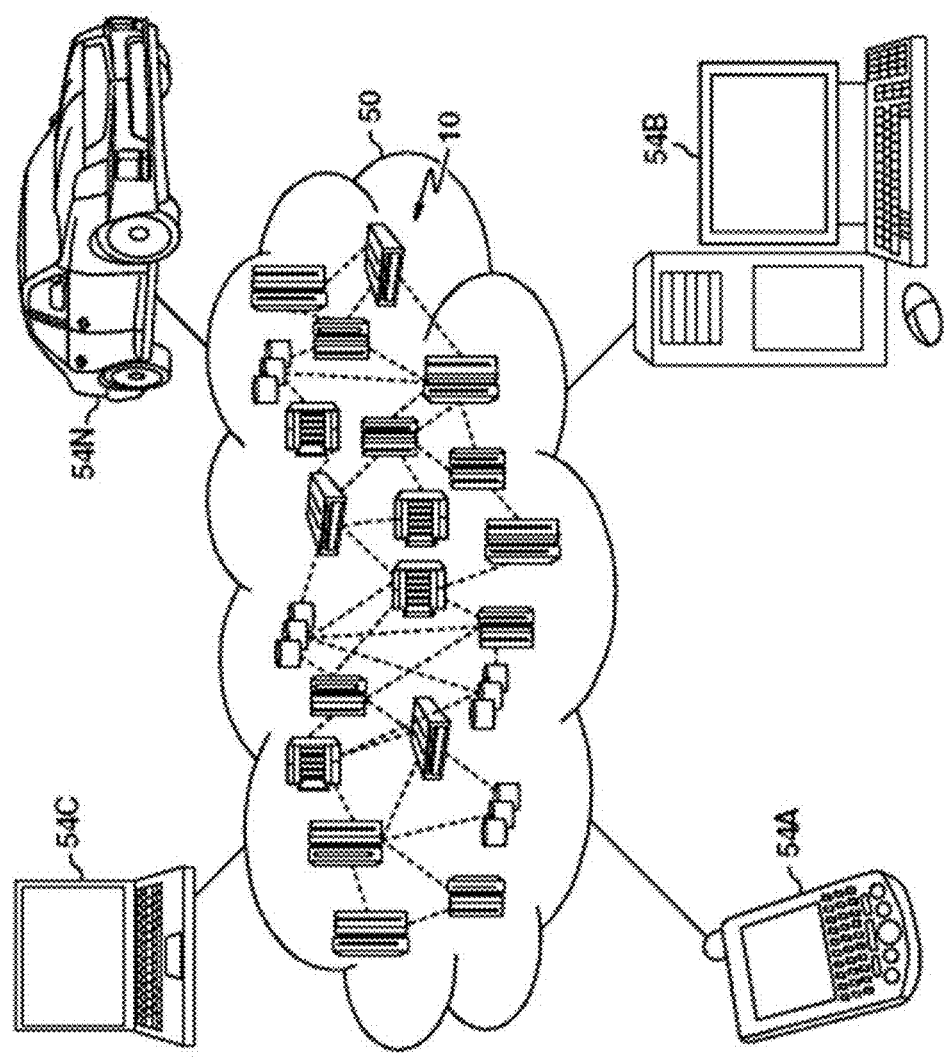
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
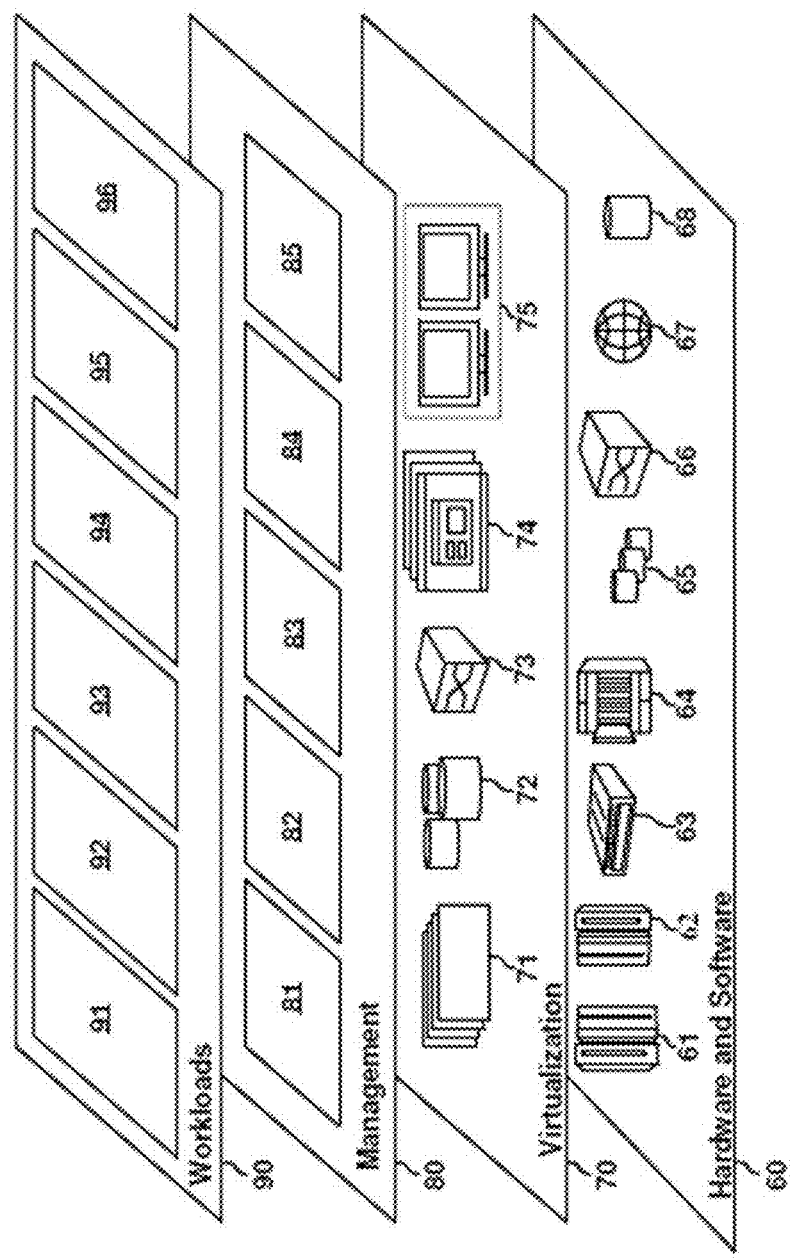
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting changes to a firebreak line 96.

Figure 3:
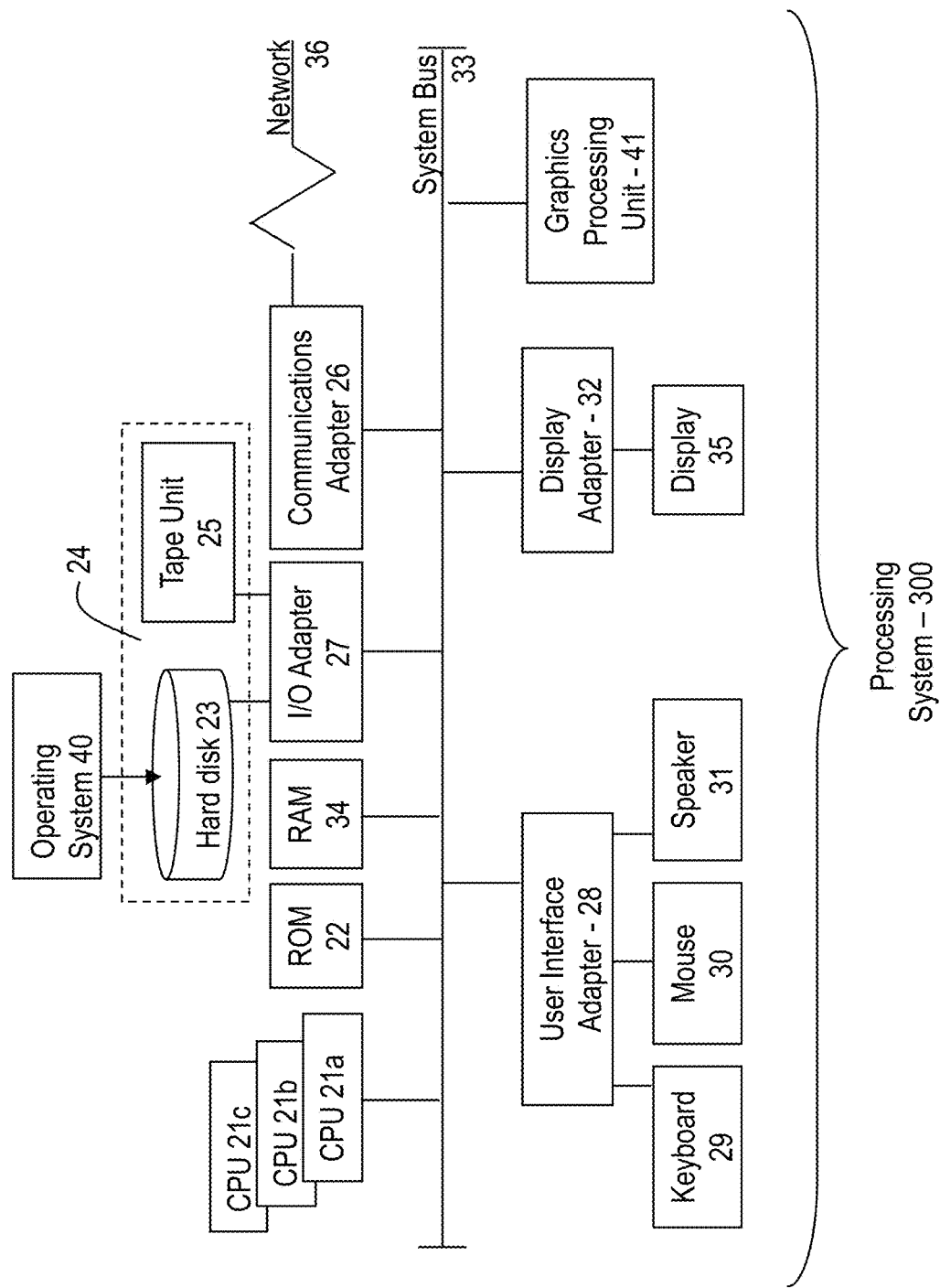
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to a more detailed description of aspects of the present invention, methods, systems, and computer program products for detecting changes to a firebreak line are provided. In exemplary embodiments, aerial images of an area of interest that includes one or more firebreak lines are obtained and analyzed to identify the one or more firebreak lines in the area of interest. Once a firebreak line has been identified, newly received images of the area of interest are compared to previously received images of the area of interest to detect any changes to the firebreak line. Based on detecting a change in a firebreak line, an alert is created and transmitted to a user to alert the user of the detected change. In exemplary embodiments, the alert includes a series of images that illustrate the detected change in the firebreak line.

In one embodiment, the aerial images are obtained by a drone flying over the area of interest. In another embodiment, the aerial images are obtained via a satellite. In exemplary embodiments, aerial images of the area of interest are obtained periodically, such as once a day, once a week, for a long period of time, i.e., over multiple years. In exemplary embodiments, continuous monitoring of firebreak lines is used to detect changes to firebreak lines and to determine if the changes are the result of malicious behavior of individuals manipulating firebreak lines of the changes are due to natural cause changes. Firebreak lines are a practice from fire protection engineering, which aim to protect virgin forests from wild or malicious fire.

In one embodiment, one or more firebreak lines are identified using image processing techniques to detect firebreak lines by identifying an area of land that has been cleared at the border of a forest or cultivated land. In exemplary embodiments, the firebreak lines, and changes thereto, are identified using image recognition to detect differences in contrasts, color analysis, and image analysis of the same region at different times. In other embodiments, one or more firebreak lines are manually identified by a user.

Figure 4:
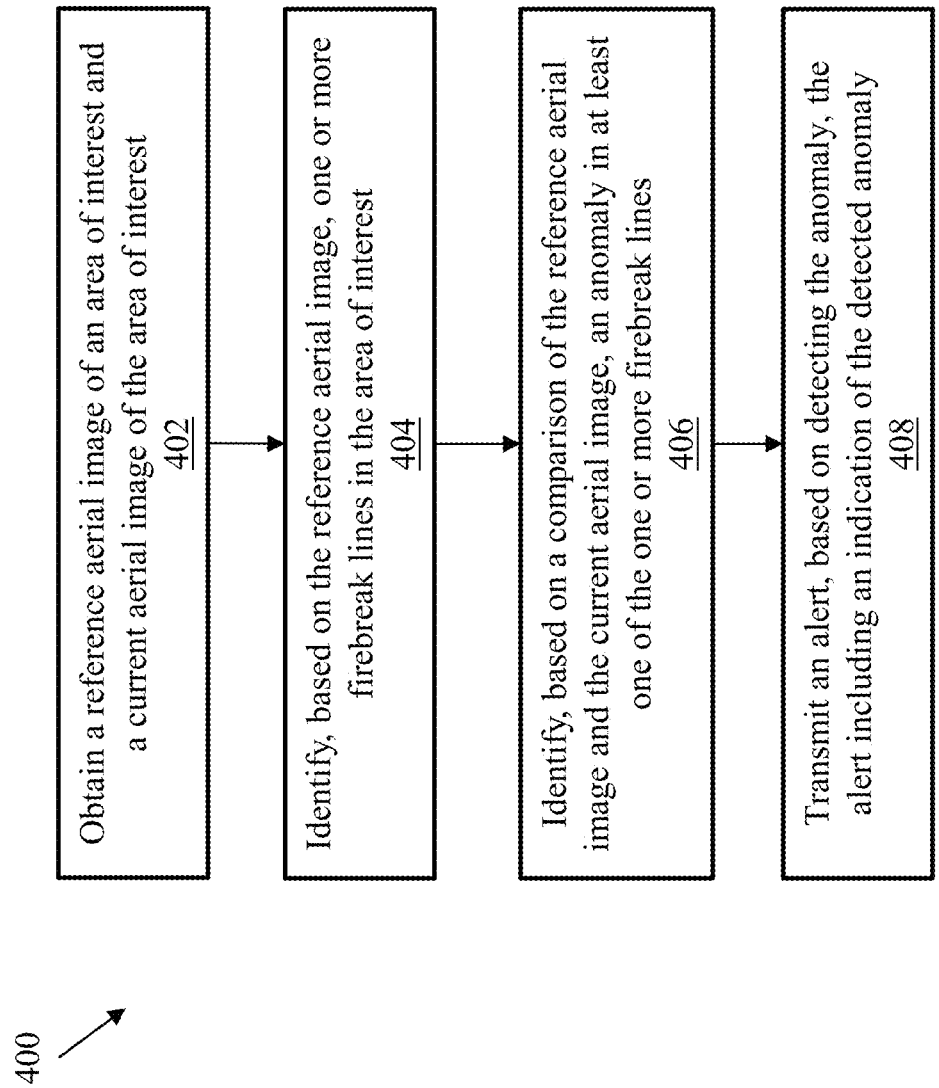
FIG. 4 depicts a flow diagram of a method for detecting changes to a firebreak line according to one or more embodiments of the invention.

Referring now to FIG. 4 a flow diagram of a method 400 for detecting changes to a firebreak line according to one or more embodiments of the invention is shown. As illustrated at block 402, the method 400 includes obtaining a reference aerial image of an area of interest and a current aerial image of the area of interest. Next, as shown at block 404, the method 400 includes identifying, based on the reference aerial image, one or more firebreak lines in the area of interest. In exemplary embodiments, the firebreak lines are identified using image recognition to detect differences in contrasts, color analysis, and image analysis. The method 400 also includes identifying, based on a comparison of the reference aerial image and the current aerial image, an anomaly in at least one of the one or more firebreak lines, as shown in block 406. The method 400 concludes a block 408 by transmitting an alert, based on detecting the anomaly, the alert including an indication of the detected anomaly. In exemplary embodiments, the alert includes a series of images of the area of interest and at least one of the series of images includes an annotation of the area of the firebreak line that includes the detected anomaly.

In one embodiment, the alert also includes an indication of the cause of the detected anomaly that was identified, i.e., a natural cause or human intervention. The cause may be determined based on the nature and time duration over which the anomaly was identified. In exemplary embodiments, the alert indicates that the anomaly is a one of a change to an existing firebreak line, an absence of one or more previously existing firebreak lines, or a newly detected firebreak line. In one embodiment, the alerts are provided to forestry management experts associated with the area of interest, which are responsible for reviewing the alerts, inspecting the firebreak lines, and instructing owners of the land to take the appropriate actions to make the firebreak line in compliance with local regulations. In exemplary embodiments, the detection of new firebreak lines can indicate illegal deforestation, i.e., that a farm is illegally advancing into the forest.

In an exemplary embodiment, when no anomaly is detected between a reference image and a current image of the area of interest, the firebreak definitions are in compliance and no warnings are generated. In these cases, a most recently captured image of the area of interest is saved and used as a new reference image as it contains new firebreak definitions that will be considered on future analysis of the corresponding area.

Figure 7:
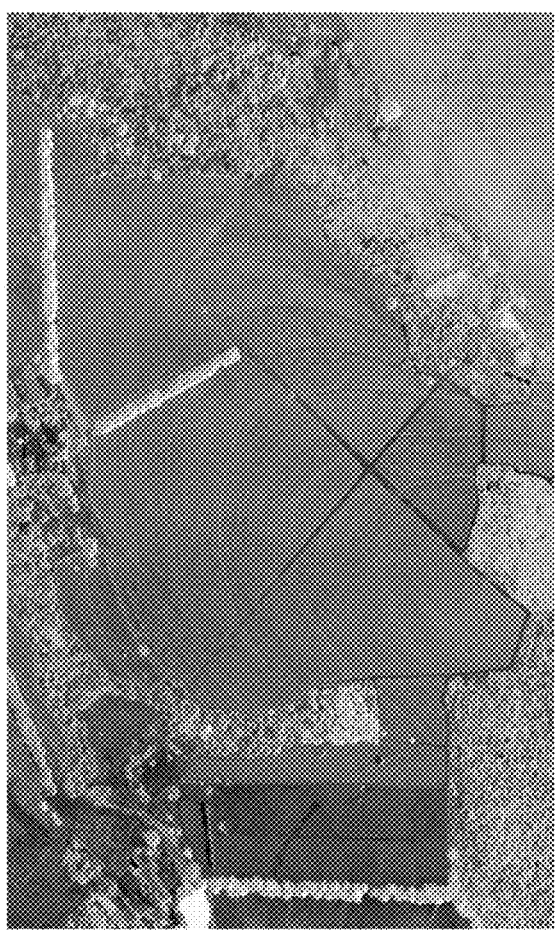
FIG. 7 depicts a modified reference aerial image having an inverted color balance and reduced opacity according to one or more embodiments of the invention.
Figure 6:
FIG. 6 depicts a reference aerial image of an area of interest having a firebreak line according to embodiments of the invention.
Figure 8:
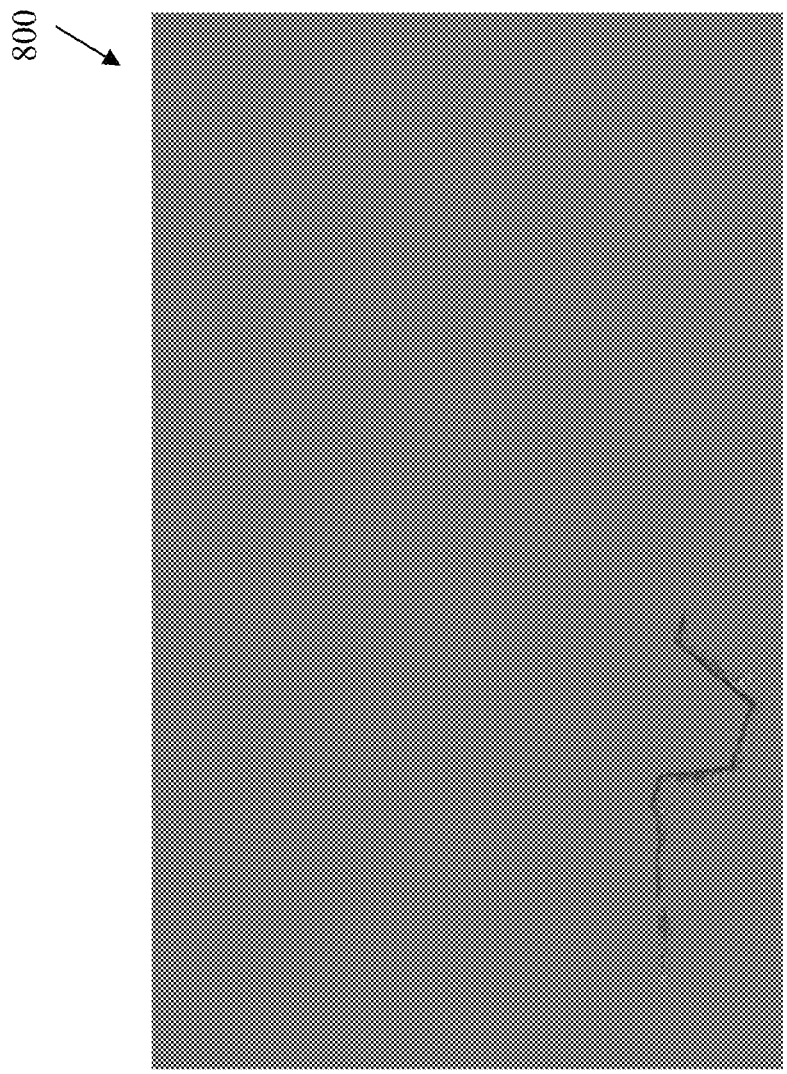
FIG. 8 depicts the reference aerial image superimposed on the modified reference aerial image according to one or more embodiments of the invention.

Referring now to FIG. 5 a flow diagram of a method 500 for comparing aerial images of an area to identify an anomaly in a firebreak according to one or more embodiments of the invention is shown. As illustrated at block 502, the method 500 includes obtaining a reference aerial image of an area of interest and a current aerial image of the area of interest. FIG. 6 depicts a reference aerial image 600 of an area of interest having a firebreak line according to embodiments of the invention. Next, as shown at block 504, the method 500 includes modifying the reference aerial image by inverting a color balance and reducing the opacity by fifty percent. FIG. 7 depicts a modified reference aerial image 700 having an inverted color balance and reduced opacity according to one or more embodiments of the invention. The method 500 also includes creating a delta image by superimposing the current aerial image over the modified reference aerial image, as shown at block 506. FIG. 8 depicts a delta image 800, i.e., the reference aerial image superimposed on the modified reference aerial image, according to one or more embodiments of the invention. The method 500 concludes at block 508 by identifying, based on the delta image, an anomaly in at least one of the one or more firebreak lines.

Technical benefits of detecting changes to a firebreak line include increasing the amount of land that can be monitored for compliance with firebreak regulations by utilizing continuous collection and automated analysis of aerial images collected over a long period of time. By automating the analysis of aerial images and using continuous collection compliance with firebreak regulations are monitored to prevent illegal deforestation and to reduce the risk to property posed by improperly maintained firebreak lines.

Additional processes may also be included. It should be understood that the processes depicted in FIGS. 4 and 5 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for detecting changes to a firebreak line in an environment, the method comprising:

obtaining a reference aerial image of an area of interest and a current aerial image of the area of interest;

identifying, based on the reference aerial image, one or more firebreak lines in the area of interest, wherein the one or more firebreak lines are identified as areas void of vegetation between differing areas of vegetation;

identifying, based on a comparison of the reference aerial image and the current aerial image, an anomaly in at least one of the one or more firebreak lines; and transmitting an alert, based on detecting the anomaly, the alert including an indication of the detected anomaly.

2. The computer-implemented method of claim 1, wherein identifying the anomaly in at least one of the one or more firebreak lines includes modifying the reference aerial image by inverting a color balance, reducing an opacity, and superimposing the current aerial image over the modified reference aerial image.

3. The computer-implemented method of claim 1, further comprising, in response to identifying the one or more firebreak lines, documenting information associated with the identified firebreak lines.

4. The computer-implemented method of claim 3, wherein the detected anomaly is a determination that a previously documented firebreak line is missing from the current aerial image.

5. The computer-implemented method of claim 3, wherein the detected anomaly is a determination that a new firebreak line is present in the current aerial image that was not previously documented.

6. The computer-implemented method of claim 1, wherein the detected anomaly is a determination that a change has been made to the at least one of the one or more firebreak lines.

7. The computer-implemented method of claim 1, wherein the alert includes a series of aerial images of the area of interest and an annotation of the anomaly.

8. A system comprising:
a processor communicatively coupled to a memory, the processor configured to:
obtain a reference aerial image of an area of interest and a current aerial image of the area of interest;
identify, based on the reference aerial image, one or more firebreak lines in the area of interest, wherein the one or more firebreak lines are identified as areas void of vegetation between differing areas of vegetation;
identify, based on a comparison of the reference aerial image and the current aerial image, an anomaly in at least one of the one or more firebreak lines; and
transmit an alert, based on detecting the anomaly, the alert including an indication of the detected anomaly.

9. The system of claim 8, wherein identifying the anomaly in at least one of the one or more firebreak lines includes modifying the reference aerial image by inverting a color balance, reducing an opacity, and superimposing the current aerial image over the modified reference aerial image.

10. The system of claim 8, wherein the processor is further configured to, in response to identifying the one or more firebreak lines, document information associated with the identified firebreak lines.

11. The system of claim 10, wherein the detected anomaly is a determination that a previously documented firebreak line is missing from the current aerial image.

12. The system of claim 10, wherein the detected anomaly is a determination that a new firebreak line is present in the current aerial image that was not previously documented.

13. The system of claim 8, wherein the detected anomaly is a determination that a change has been made to the at least one of the one or more firebreak lines.

14. The system of claim 8, wherein the alert includes a series of aerial images of the area of interest and an annotation of the anomaly.

15. A computer program product for detecting changes to a firebreak line in an environment comprising a computer readable storage medium having program instructions embodied therewith, the program instructions executable by a processor to cause the processor to perform a method comprising:
obtaining a reference aerial image of an area of interest and a current aerial image of the area of interest;
identifying, based on the reference aerial image, one or more firebreak lines in the area of interest, wherein the one or more firebreak lines are identified as areas void of vegetation between differing areas of vegetation;
identifying, based on a comparison of the reference aerial image and the current aerial image, an anomaly in at least one of the one or more firebreak lines; and
transmitting an alert, based on detecting the anomaly, the alert including an indication of the detected anomaly.

16. The computer program product of claim 15, wherein identifying the anomaly in at least one of the one or more firebreak lines includes modifying the reference aerial image by inverting a color balance, reducing an opacity, and superimposing the current aerial image over the modified reference aerial image.

17. The computer program product of claim 15, further comprising, in response to identifying the one or more firebreak lines, documenting information associated with the identified firebreak lines.

18. The computer-implemented method of claim 1, wherein the alert includes an indication of a cause of the detected anomaly, wherein the cause is one of a natural cause and a human intervention.

* * * * *